May 25, 1926.
H. V. SWENSON
STATIONERY
Filed Nov. 19, 1923
1,585,946
Fig. 2.
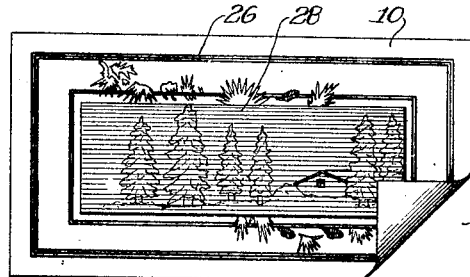
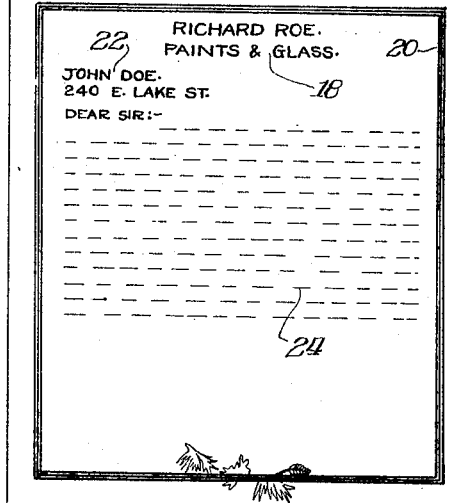
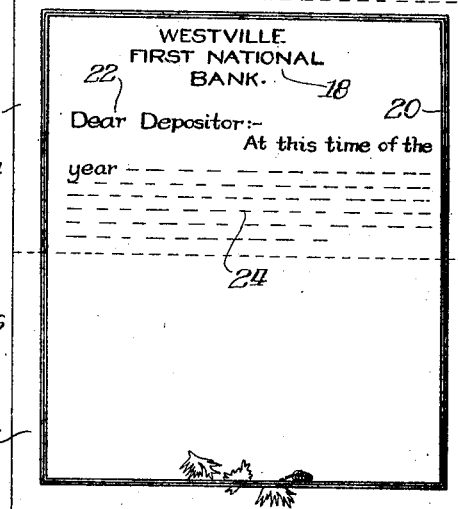
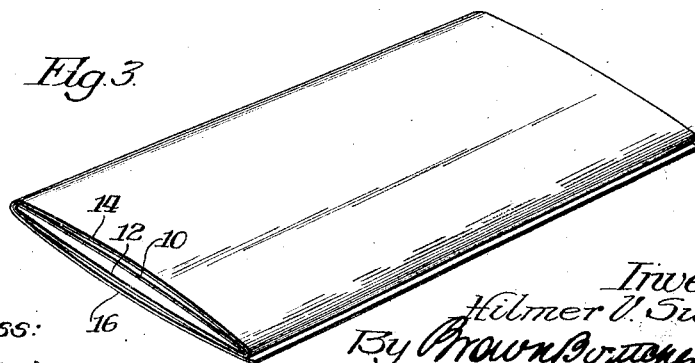

Patented May 25, 1926.

1,585,946

UNITED STATES PATENT OFFICE.

HILMER V. SWENSON, OF CHICAGO, ILLINOIS.

STATIONERY.

Application filed November 19, 1923. Serial No. 675,646.

My invention relates to stationery, and more specifically to an improved letter sheet of the general type in which advertising or other extraneous matter is transmitted to the recipient of the letter, along with the subject matter proper of the correspondence. U. S. Patent No. 1,423,910 to Howard B. Campbell, July 25, 1922, is one example of this type.

Among the objects of the invention are to be included an extension of the variety of uses to which stationery of this type may be put, and more specifically an improvement in the convenience with which correspondence of this nature may be handled as a matter of record after its receipt.

Further objects and advantages of the invention will become apparent as the description proceeds.

In the accompanying drawings—

Fig. 1 shows a letter sheet according to the invention, with the flap or fold in substantially closed position;

Fig. 2 shows a generally similar sheet with the flap or fold open; and

Fig. 3 is a view of a folded sheet ready to be inserted into an envelope.

In the embodiment of the invention selected for illustration, the letter sheet comprises four portions—10, 12, 14 and 16. Of these portions, 10 may be referred to as the fold, and the remaining portions as the body, of which the upper one 12 is covered by the fold when in the position shown in Fig. 1. The letter-head of the user is placed at 18 inside a panel formed by marginal rulings 20. Below the letter-head the address of the recipient may be placed in writing the letter at 22 in the usual way, and the body of the letter follows at 24.

On the outer face of the flap, I have illustrated rulings 26 similar to rulings 20, defining another panel harmonizing with the panel on the two lower body portions. Within the upper panel, I may provide appropriate decorations or illustrative matter 28 of a purely decorative nature, or having particular connotation or suggestiveness in connection with either the letter-head of the user, or the subject matter of the letter.

It will be apparent that in the position shown in Fig. 1 the letter may come to the hands of the recipient and appear to be, in all respects, an ordinary letter, with a little ornamentation above the letter-head. On turning the fold 10 back to the position shown in Fig. 2, two additional areas are exposed comprising the inner surfaces of parts 10 and 12. Part or all of this normally concealed area may carry additional advertising or other matter, such, for instance, as a description, advertisement or price list of the goods of the writer, or, as in Fig. 2, a statement of the condition of the bank sending out the letter.

The sheets may be typed or written, either in the condition shown in Fig. 1 or that in Fig. 2. Thus the subject matter on parts 14 and 16 may be either a form letter or an individual letter, and similarly that appearing on sections 10 and 12, while it may ordinarily be printed, might be individual to the particular letter. Thus, in making collections, parts 14 and 16 might contain a request for a remittance on account, and parts 10 and 12 might have typed thereon a statement of the account of the individual to whom the letter is to be sent.

After the letter is written and ready to mail, it may be folded as shown in Fig. 3. This will ordinarily be done by folding sections 10 and 12 on section 14 first, and in doing this the edge of section 10 will define with fair accuracy the line on which folding will take place. It will be obvious that after the recipient has read the entire letter, parts 10 and 12 may conveniently be detached from parts 14 and 16 along the fold thus formed, either with or without a series of perforations in the paper to assist in severing the same. This makes it possible either to file the body of the letter in one place and sections 10 and 12 in another, or to discard sections 10 and 12 in case they are of an advertising or any other similar nature, thereby avoiding padding the file of the recipient with matter he does not care to preserve.

Without further elaboration, the foregoing will so fully explain the gist of my invention, that others may, by applying current knowledge, readily adapt the same for use under various conditions of service. It will for instance, be obvious that with certain sizes of sheet it might be advantageous to position the letter-head at the upper edge of section 12, as viewed in Fig. 2, and confine the concealed advertising matter to the inner surface of fold 10. When this is done, it is still equally convenient to detach and discard fold 10 and reserve the remaining portion of the sheet for filing, without in any way mutilating the portion kept. These and many other modifications and alterations may readily be made by those skilled in the art without eliminating certain features which may properly be said to constitute the essential items of novelty involved, which items are intended to be defined and secured to me by the following claims.

I claim:

1. A letter sheet having a fold extending downwardly from the top of the sheet, the letterhead being on the body of the sheet below the fold, and ornamentation on the outer face of the fold.

2. A letter sheet having a fold extending downwardly from the top of the sheet, the letterhead being on the body of the sheet below the fold, ornamentation on the outer face of the fold, and marginal rulings on the fold and body to give the fold ornamentation the appearance of a decoration for the letter-head.

3. A letter sheet having a fold extending downwardly from the top of the sheet, the letter-head being on the body of the sheet below the fold, and display matter under the fold.

4. A letter sheet having a fold extending downwardly from the top of the sheet, the letter-head being on the body of the sheet below the fold, and display matter under the fold, the lower edge of the fold defining a line of severance for separating the letter-head and body from the fold and the section covered thereby.

5. A letter sheet having a fold extending downwardly from the top of the sheet, a ruled panel on the body below the fold, and a letter-head inside said panel at the top thereof.

6. A letter sheet having a fold extending downwardly from the top of the sheet, a ruled panel on the body below the fold, a letter-head inside said panel at the top thereof, a similar panel on the outer face of said fold, and ornamentation inside said last mentioned panel.

7. A letter sheet having a fold extending downwardly from the top of the sheet, the letter-head and letter being on the body of the sheet whereby the fold may be detached and the letter properly preserved for record without the fold.

8. A letter sheet comprising a rectangular blank having a single fold turned down at the top thereof, a complete letterhead and letter space on the body below the fold, and incidental general material printed on the portions covered by the fold.

9. A letter sheet comprising a rectangular blank having a single fold turned down at the top thereof, a complete letterhead and letter space on the body below the fold, incidental general material printed on the portions covered by the fold, and ornamentation on the outside of the fold harmonizing with said letter head.

In witness whereof, I hereunto subscribe my name this 17th day of November, 1923.

HILMER V. SWENSON.